(12) United States Patent
Van Gassel et al.

(10) Patent No.: US 7,283,443 B2
(45) Date of Patent: Oct. 16, 2007

(54) POWER SAVING METHOD FOR PORTABLE STREAMING DEVICES

(75) Inventors: Jozef Pieter Van Gassel, Eindhoven (NL); Rudi Jozef Marie Wijnands, Eindhoven (NL); Johannes Henricus Maria Korst, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 162 days.

(21) Appl. No.: 10/539,029

(22) PCT Filed: Dec. 3, 2003

(86) PCT No.: PCT/IB03/05698

§ 371 (c)(1),
(2), (4) Date: Jun. 15, 2005

(87) PCT Pub. No.: WO2004/057455

PCT Pub. Date: Jul. 8, 2004

(65) Prior Publication Data

US 2006/0143420 A1    Jun. 29, 2006

(30) Foreign Application Priority Data

Dec. 20, 2002  (EP)  ................................. 02080521

(51) Int. Cl.
*G11B 5/09*    (2006.01)

(52) U.S. Cl. ................... 369/47.32; 369/47.1; 369/59.1

(58) Field of Classification Search .................... None
See application file for complete search history.

(56) References Cited

U.S. PATENT DOCUMENTS

| 6,339,811 | B1* | 1/2002 | Gaertner et al. | ............ 711/112 |
| 2002/0045961 | A1 | 4/2002 | Gibbs et al. | |
| 2005/0180269 | A1* | 8/2005 | Nanba | ..................... 369/13.05 |

* cited by examiner

*Primary Examiner*—Muhammad Edun

(57) ABSTRACT

A method (2) of controlling memory usage in a portable streaming device (100), a portable streaming device (100) and a computer readable medium (110). The portable streaming device (100) comprises at least one memory (102), at least one processing unit (101), and at least one storage device (103) being operatively connected with said memory (102) under control of said processing unit (101). The size of a disk scheduler buffer memory within said memory in said portable streaming device is adaptively maximised by said method (2) at all times. Free memory available within the portable streaming device is continuously allocated (50) and at least a portion of said allocated free memory is designated as disk scheduler buffer memory (60). Thus results improved solid state memory utilisation of the portable streaming device, and due to larger available disk buffer memory size, less start-stop-cycles of the storage device are initiated, which leads to a longer life-cycle of said portable streaming device.

16 Claims, 3 Drawing Sheets

POWER SAVING METHOD FOR PORTABLE STREAMING DEVICES

FIELD OF THE INVENTION

This invention relates in general to the field of portable storage devices and more particularly to the field of disc based portable electronic streaming devices and even more particularly to reduction of power consumption in storage media based portable electronic streaming devices.

BACKGROUND OF THE INVENTION

Portable disc based streaming devices such as portable audio players or video players are getting more and more widespread. These devices are, when e.g. carried along by its user, battery driven and total playing time before having to recharge or replace the batteries is a crucial feature distinguishing the acceptance of such devices. Total playing time depends directly on the devices' battery life, which again depends on the battery's capacity and the power consumption of the portable storage device. The portable devices are equipped with storage devices, such as a hard disk drive or an optical disk drive for storing the data, such as music clips or video sequences, to be streamed by the portable storage device. These storage devices comprise an electrically driven motor unit mechanically propelling the storage media. This operation is with regard to other units comprised in the portable storage devices a major power consumer responsible for a substantial part of the total dissipated power. In order to minimise power consumption of these storage devices, disk scheduling has been introduced. Hereby, the portable storage device comprises a cache memory and data is transferred from the disk drive to the cache memory and therefrom for further processing, and vice versa. A disk scheduler in the portable streaming device optimises the ratio between standby time and active time of the bit-engine, which is reading data from the storage device. Controlled by the disk scheduler, the storage device is spun down, i.e. the motor unit is switched off, as often and as long as possible by transferring the data to and from the storage medium of the storage device in a burst-like manner. This is achieved by using large scheduling buffers that allow the portable storage device to maximise the standby time between two accesses to the storage medium. A fixed part of the solid state memory totally available in the portable storage device is reserved for this purpose. Often, a dedicated separate hardware comprising memory circuit is arranged in the portable streaming devices as buffer memory. The larger the buffer is, the longer the drive can be switched off and hence the bigger the power savings. Although memory tends to become cheaper over time for the same amount of memory, it is still desirable to minimise the amount of hardware that is reserved for one single application, in the present case disk scheduling buffer, in order to reduce the cost and to increase the performance of portable streaming devices.

Moreover, a further problem associated with the above-described strategy of switching the storage device of the portable streaming device off and on is that the life-time of the storage devices is limited to a certain number of start-stop cycles due to the mechanical part of the storage devices suffering from wearing out. Therefore it is even for this purpose desirable to have an as large as possible buffer in order to decrease the number of start-stop cycles over time and therefore increase life-time of the storage device and thus of the portable streaming device as a whole.

SUMMARY OF THE INVENTION

The present invention overcomes the above-identified deficiencies in the art and solves the above problems by maximising the memory buffer size at all times. According to preferred embodiments of the invention a method, a portable streaming apparatus, and a computer-readable medium are disclosed according to the appended independent claims.

According to a first aspect of the invention, a method of controlling memory usage in a portable streaming device is provided. The portable streaming device comprises at least one memory, at least one processing unit, and at least one storage device which is operatively connected with the memory under control of the processing unit. According to the method, the size of a disk scheduler buffer memory within said memory in said portable streaming device is adaptively maximised. At least a portion of the available free memory is continuously allocated and designated and used as disk scheduler buffer memory.

According to another aspect of the invention, a portable streaming apparatus is provided, which comprises memory, at least one processing unit, and a storage device being operatively connected with said memory under control of said processing unit. The processing unit allocates continuously free memory in the memory and designates at least a portion of the free memory as disk scheduler buffer.

According to a further aspect of the invention, a computer readable medium is provided, which comprises a code segment instructing a processing unit to adaptively maximise the size of a disk scheduler buffer memory within memory of a portable streaming device.

An object of the invention is to use existing memory of a portable streaming device more efficiently. A further object of the invention is to extend life cycle of a portable streaming device without modification of the existing hardware. Yet another object of the invention is to minimise the amount of necessary dedicated memory reserved for disk buffering. Furthermore, an object of the invention is to improve and to be compatible with existing disk scheduling schemes.

BRIEF DESCRIPTION OF THE DRAWINGS

Preferred embodiments of the present invention will be described in the following detailed disclosure, reference being made to the accompanying drawings, in which.

DESCRIPTION OF PREFERRED EMBODIMENTS

According to the invention, buffer size of the disk scheduling buffer is adaptively maximised in its size at all times. According to a preferred embodiment, a fixed size part of a scheduling buffer is provided, as in conventional schedulers, and an extra variable size part that adaptively changes in size depending on the availability of free solid state memory space in the portable streaming device. The fixed size part can be zero as well, whereby the device in this case only works with a variable memory part.

Figure 2:
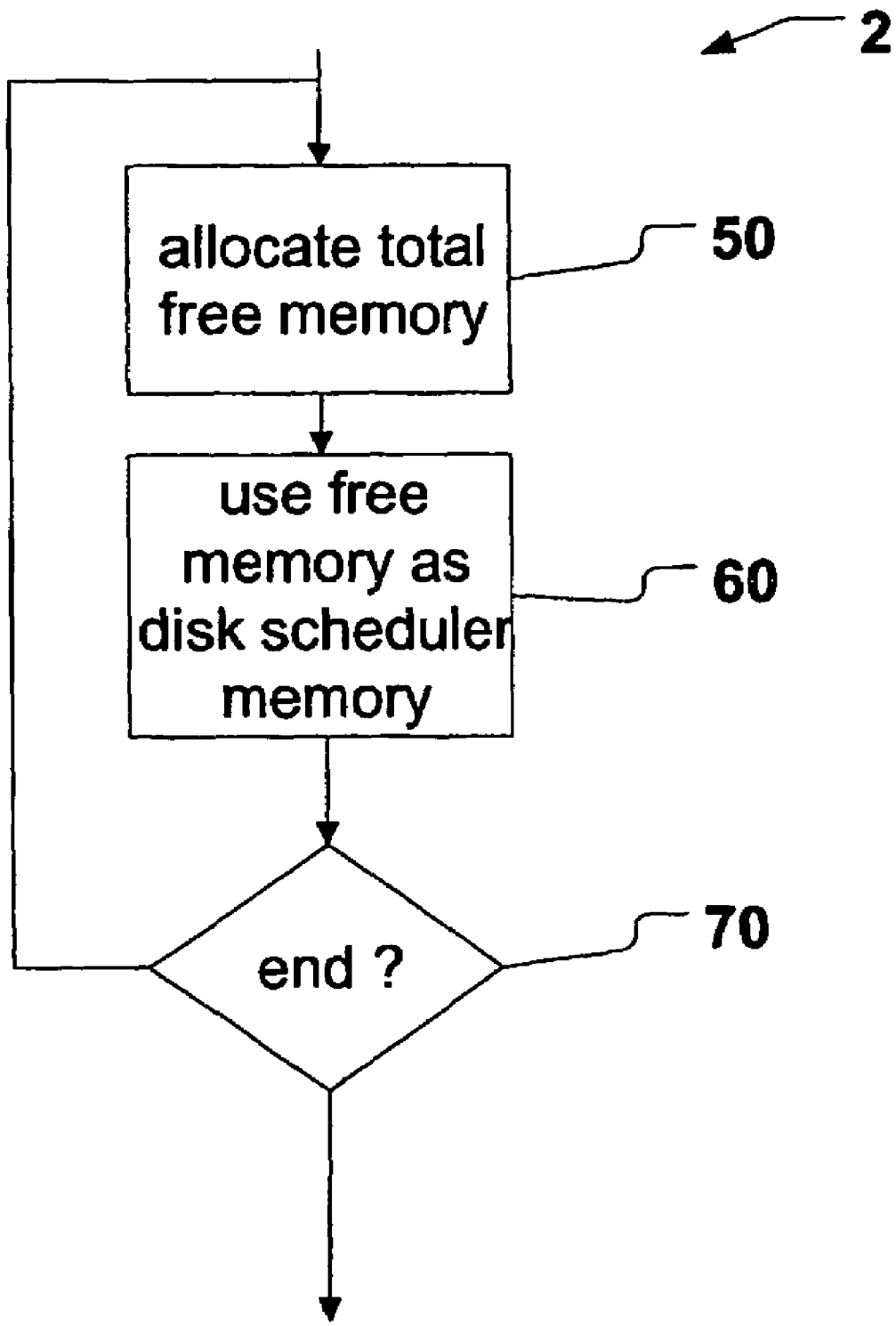
FIG. 2 illustrates in a flowchart a method according to an aspect of the invention.

FIG. 2 illustrates in a flowchart a method 2 according to an aspect of the invention. In a portable streaming device, the size of a disk scheduler buffer memory is adaptively maximised within a memory in said portable streaming device. Free memory is in step 50 continuously allocated. In step 60, at least a portion of said allocated free memory is designated and used as disk scheduler buffer memory. The allocation is repeated continuously or terminated in step 70.

The total amount of solid state memory (e.g. DRAM or SRAM) available in a device is inherently limited and fixed in size and shared by a number of different components in the system. The scheduling buffer is only one of these, other users of the same memory pool are the application, operating system and possibly other internal devices in the system, such as video codecs, connected to an internal bus. By allocating free memory space, i.e. memory currently not in use, to the disk scheduler buffer, the average scheduler buffer size is significantly increased leading to longer standby times of the bit engine and hence reduced power consumption and increased life-time. This leads as well to an improved solid state memory utilisation of the portable streaming device.

In typical mobile real-time applications, such as audio and/or video playback and/or recording, memory usage of non-scheduling tasks will be substantially stationary over time. In that situation the unused memory can easily be added to the scheduling buffers. As mobile infotainment devices are flexible devices that can execute a vast array of different applications, the available free memory is usually significant. The total available memory is targeted at the most demanding application in terms of memory usage which generally is not play back or recording of video material.

Considering play back of encoded video in a non-limiting example, the total memory used for temporarily storing the uncompressed frames is often less than 8 MB for standard definition video material. For a portable streaming device having typically 64 MB of total memory, given a fixed scheduler buffer size of e.g. 32 MB, an extra 24 MB of memory can be added to the buffer leading to a total scheduler buffer size of 56 MB. This doubles almost the ratio between standby time and active time for this particular example of the invention, without any costly modification of the existing hardware, whereby the life cycle of the device is still almost doubled.

In case of multiple audio/video streams, such as with layered encoding formats, the available free solid-state memory is divided over multiple streams, whereby the memory is not necessarily distributed equally over the streams. Buffer sizes for each stream also depend on the bit-rate of the individual streams. Streams with lower bit-rates require smaller buffer sizes, hence available memory is preferably spent on high bit-rate streams. In case applications which are running concurrently to the real-time streaming application, start requesting more memory, the scheduler buffer sizes can be gradually reduced to the original fixed size.

For applications or background tasks that are bursty in terms of memory usage, and which are running concurrently to the streaming application, a number of extra provisions are taken. However it is to be noted that play back or recording of video material on-the-go, i.e. when power saving is most important, is a task that generally entirely takes up the attention of the portable streaming device. It is not very likely that there will be many other tasks consuming a lot of memory. This is mainly due to the fact that watching or recording video is generally speaking an activity that requires the full attention of the user of the portable streaming device. Therefore, no other tasks will be running and hence not a lot of additional memory will be required. However, when playing back video with maximal scheduler buffers, it is possible that non-streaming application or the OS requests memory that is not available because it is being used by the scheduler buffer. This situation is resolved by arranging and organising the total memory in the device available in such a particular manner as described below, so that the number of these occurrences can be reduced.

Figure 1:
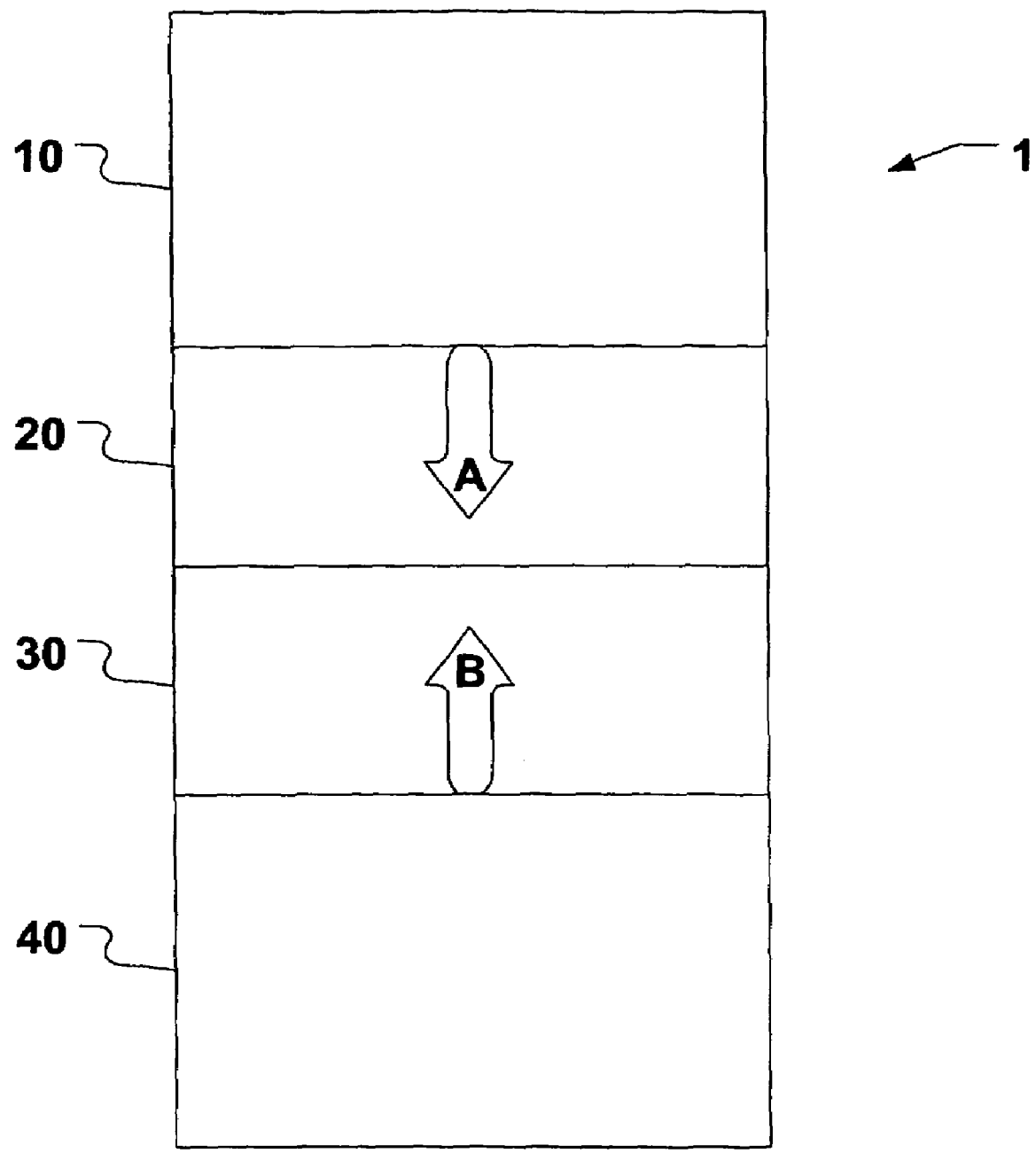
FIG. 1 shows a schematic view of the memory handling principle according to an embodiment of the invention.

FIG. 1 shows a conceptual diagram, which illustrates a virtual memory space of a preferred embodiment of the invention. The total memory available 1 in the portable streaming device is subdivided into sections 10, 20, 30, 40 which are either reserved for reserved for a particular purpose, such as streaming applications, or which are available for general use, e.g. by other applications or the OS. Memory sections 10, 20, 30 and 40 need not be contiguous memory sections in the portable streaming device. The illustration according to FIG. 1 is purely illustrative and shall not be interpreted in such a way that memory sections 10, 20, 30 and 40 are necessarily contiguous memory sections in the portable streaming device. On the contrary, the four memory sections can be distributed over different memory ranges and memory devices within the portable streaming devices. In addition, at least some of the memory sections 10, 20, 30, 40 can equally be zero, as already indicated above. The proportion of memory sections in FIG. 1 is also purely illustrative and not necessarily to scale. Memory section 10 is used as a fixed part entirely reserved to the scheduler as buffer memory. Memory section 20 is a variable part used by the disk scheduler as further buffer memory. Memory section 40 is used by all applications, except the scheduler, as well as by the OS. Memory section 40 grows from the bottom up according to arrow B, and the scheduler buffers grow from the top down according to arrow A, leaving a certain safety margin 30 in between the sections 20, 40. The scheduler part 10, 20 is implemented in such a way that the video data in the scheduler buffer that is needed first, either for writing to the disc or transferring to a decoder or networked connection, is located nearest to the top of the buffer. In order to achieve this, some central entity, e.g. an extension of the OS, needs to manage the total memory pool 1 used by all the memory consuming entities in the mobile device in a centralised way.

In the case of reading from the storage medium, also called playback, the following applies. In the case of reading data from the medium, i.e. during playback, it is to be avoided that scheduler buffer content with an early deadline is overwritten with memory allocated by the application or OS. Only data required furthest in the future should be overwritten in case the safety margin is exceeded. In other words data for which there is still plenty of time to retrieve it again from the medium, which will be earlier than originally planned, preferably at the next medium access. This only occurs when the entire safety margin 30 is completely consumed. By reserving a minimum scheduler buffer size 10 as discussed above, equal to the buffer size for conventional scheduler buffer sizes, the overall performance in terms of power usage of cycle times will never be worse than with conventional schedulers.

The scheduler buffer 10, 20 depicted in the FIG. 1 is conceptually a queue, preferably implemented as a circular buffer. Fragmentation of data is not an issue since data is always added to the front and read from the back, preferably in relatively large chunks. Only data at the end of the queue, i.e. data which is most recently added, will be overwritten, if needed for other applications. For the other tasks, i.e. non scheduler buffer usage, in the device this is different because for instance a chunk of allocated memory will be freed later than more recently allocated data which might lead to gaps and hence fragmentation of the bottom part of the memory pool. De-fragmentation in the bottom part, i.e. application and OS memory 40, is reduced by either performing active de-fragmentation or using more advanced memory pool management methods, such as scatter-gather like memory allocation that utilises smaller gaps in between allocated parts.

In case of writing to the storage medium, also called recording, the following applies. In recording mode generally a larger buffer size is needed. There exists a risk of losing data because of either power failure or because part of the scheduler buffer memory is claimed by the portable streaming device for other tasks during recording, e.g. for the OS or various applications. In the latter case it could be necessary to preemptively flush part of the scheduler buffer to the storage medium in order to save up memory for the other task. This might lead to the stalling of applications that cannot claim access to the memory for the brief moment, when writing to the storage medium. However, the stalling of applications for a brief moment is not a big issue since these applications are considered to be non real-time applications in the first place. Loosing valuable data being recorded on the other hand is a much bigger issue which justifies this trade-off. Still, since there is a minimum buffer size, and by choosing an appropriate safety margin the occurrence of these situations can be reasonably controlled, especially if the implementer has complete control of all the tasks running on the device. In the other case of power failure, the amount of data loss can be significantly larger because of the large buffer sizes used for optimising power consumption scheduling. Especially for recording applications this can be a major issue as we will see in the following illustrative example. Assuming a buffer size of 64 MB and a recording of video by the portable streaming device, such as a camcorder, at a rate of 12 Mbps, after a power failure in total over 40 seconds of video are lost with conventional memory circuits. This might possibly contain a unique emotional valuable event being shot by the user operating the camcorder. According to an embodiment of the invention, these recording devices comprise non-volatile solid state memory not suffering from so called hot-spots, i.e. a limited number of writes per memory cell. Preferably MRAM (magnetoresistive random access memory), being of the above mentioned memory type, is used for this task. MRAM is a solid state memory that is both fast and does not suffer from hot-spots. Conventional random access memory (RAM) computer chips store information as long as electricity flows through them and is therefore not suitable for this task. As power is lost, the information is also. MRAM, however, retains data after a power supply is cut off MRAM works according to a principle of storing data bits using magnetic charges instead of the electrical charges used by DRAM (dynamic random access memory). Replacing DRAM with MRAM prevents data loss in portable streaming devices in the recording case. In this way, even after power failure, the video information stored in the MRAM is stored persistently and can be recovered after reconnecting the power.

In order for the memory-pool manager, which is responsible for the allocation of memory for all processes in the device, to limit the number of occurrences where safety margin 30 is consumed, the memory-pool manager keeps track of the memory usage of different tasks and applications by tracking memory usage over time. These memory usage statistics are subsequently used to control the safety margin 30 or possibly even eliminate the need for it entirely.

When this information is stored persistently, e.g. in the file system, it can be referred to when playing back the same content or using the same application and/or codecs. If needed the memory usage information could not only be limited to the software, but also the played back content as well, i.e. some content will require larger intermediate buffers than other content.

Figure 3:
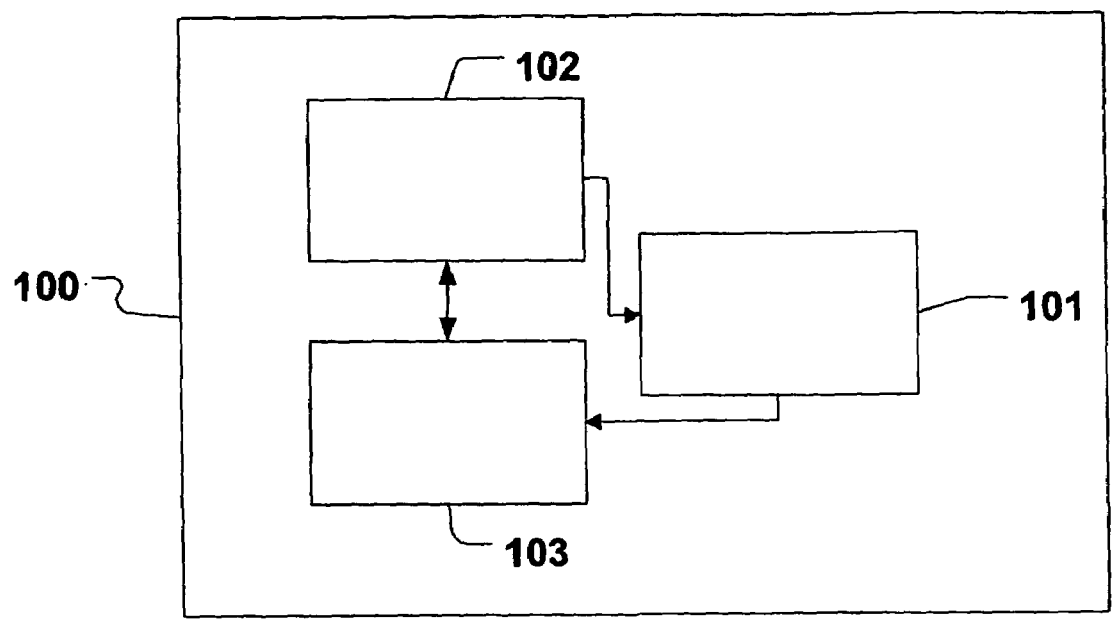
FIG. 3 illustrates a portable streaming device according to another aspect of the invention.

FIG. 3 shows a portable streaming device according to another aspect of the invention. A portable streaming device 100 comprises a memory 102, at least one processing unit 101, and a storage device 103 being operatively connected with said memory 102 under control of said processing unit 101. The processing unit 101 adaptively maximises the size of a disk scheduler buffer memory within said memory 102 in said portable streaming device 100, preferably according to the method described above.

Figure 4:
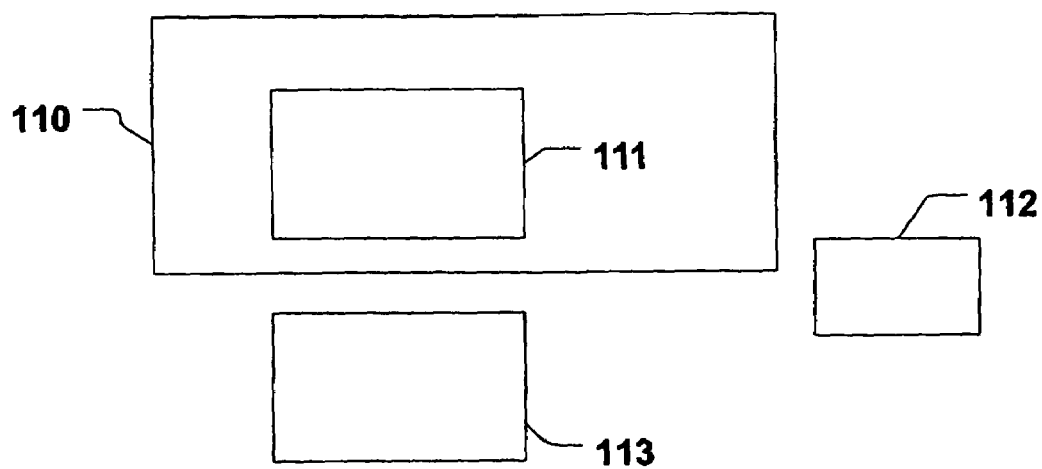
FIG. 4 shows a computer readable medium according to yet another aspect of the invention.

FIG. 4 shows a computer readable medium 110 according to yet another aspect of the invention. The computer readable medium 110 includes a computer program 111 for processing by a processing unit 112. The computer program 111 comprises a code segment for adaptively maximising the size of a disk scheduler buffer memory within memory of a portable streaming device, preferably according the method described above.

The optical disk can e.g. be a rewritable CD, DVD or a small form factor optical disc (SFFO). Small-form-factor optical (SFFO) disc drives are miniaturised optical disk drives having a high capacity. SFFO technology is specially suitable for portable devices, such as portable streaming devices.

In certain cases, portable streaming devices comprise so called ESP memory, which stands for electronic shock protection memory. Here, the memory is used in a portable streaming device, e.g. a CD player or car CD player, which suffers a noise problem because of external shocks. To get clean sound, an electronic shock protection (ESP) system is used, buffering a certain amount of data in said buffer memory. An ESP system cannot clear noises if the external shock continues too long as it runs out of memory. The time limitation is dependent on the memory buffer size and the data-compression ratio. Here again, the buffer size is desirable to be as large as possible, and the method according to the invention can be used for ESP memory instead of a disk scheduler memory as well as the ESP memory can be allocated to one of the above described memory sections when implementing the method of the invention.

It is possible to use the present invention in combination with existing disk scheduling schemes for reducing power consumption.

Applications and use of the above described power saving strategy according to the invention are various and include exemplary fields such as portable MP3 players and portable camcorders, but also portable computers such as handhelds, notebooks or laptops for streaming data.

The present invention has been described above with reference to specific embodiments. However, other embodiments than the above are equally possible within the scope of the appended claims, e.g. different kinds of memories, OS, portable devices than those described above, performing the above method by hardware or software, etc.

Furthermore, the term "comprising" does not exclude other elements or steps, the terms "a" and "an" do not exclude a plurality and a single processor or other unit may fulfill the functions of several of the units or circuits recited in the claims.

The invention can be summarised as a method (2) of controlling memory usage in a portable streaming device (100), a portable streaming device (100) and a computer readable medium (110). The portable streaming device (100) comprises at least one memory (102), at least one processing unit (101), and at least one storage device (103) being operatively connected with said memory (102) under control of said processing unit (101). The size of a disk scheduler buffer memory within said memory in said portable streaming device is adaptively maximised by said method (2) at all times. Free memory available within the portable streaming device is continuously allocated (50) and at least a portion of said allocated free memory is designated as disk scheduler buffer memory (60). Thus results improved solid state memory utilisation of the portable streaming device, and due to larger available disk buffer memory size, less start-stop-cycles of the storage device are initiated, which leads to a longer life-cycle of said portable streaming device.

The invention claimed is:

1. A method of controlling memory usage in a portable streaming device, said device comprising at least one memory, at least one processing unit, and at least one storage device being operatively connected with said memory under control of said processing unit, said method comprising the steps of:
   adaptively maximizing the size of a disk scheduler buffer memory within said memory in said portable streaming device using the sub-steps of:
   continuously allocating available free memory in said portable streaming device; and
   designating and using at least a portion of said allocated free memory as the disk scheduler buffer memory.

2. The method as claimed in claim 1, whereby the step of maximizing the disk scheduler buffer size comprises enhancing the total amount of available disk scheduler buffer memory in said portable streaming device, wherein allocated free memory is used as the disk scheduler buffer memory in combination with an existing disk scheduler buffer memory in said portable streaming device.

3. The method as claimed in claim 1, whereby individual buffer sizes are designated, within the disk scheduler buffer memory, to individual streams, and buffer memory sizes depend on the streams bit-rate.

4. The method as claimed in claim 1, whereby the step of adaptively maximizing the size of a disk scheduler buffer memory comprises the step of continuously arranging the total memory in the portable streaming device in subsections comprising:
   a first memory section being a fixed part entirely reserved to a disk scheduler as buffer memory,
   a second memory section being a variable part used by the disk scheduler as further buffer memory,
   a third memory section being used by all applications of the portable streaming device, except the scheduler, as well as by an operating system (OS), and
   a fourth memory section in between the second section and the third section, being a safety margin, whereby the third memory section increases or decreases by allocating memory from respectively to the fourth memory section, and
   the second memory section increases or decreases by allocating memory from respectively to the fourth memory section.

5. The method as claimed in claim 4, whereby at least one of said four memory sections has a memory size equal to zero.

6. The method as claimed in claim 4, wherein said method further comprises a continuous memory pool management comprising the steps of:
   increasing and/or decreasing of the second and/or the third memory section depending on memory requirements of said applications and said OS; and
   allocating at least a part of the available memory of the fourth memory section to said second memory section.

7. The method as claimed in claim 6, whereby the scheduler buffer, comprising the first memory section and the second memory section, is arranged as a queue.

8. The method as claimed in claim 6, whereby the continuous memory pool management further comprises the steps of:
   tracking memory usage over time; and
   controlling the size of said fourth memory section based on memory usage statistics based on said tracking of memory usage.

9. The method as claimed in claim 8, whereby said usage statistics is stored persistently, in a file system.

10. The method as claimed in claim 4, whereby the first, second, third or fourth memory section are non-contiguous memory sections of said portable streaming device.

11. A portable streaming device comprising memory, at least one processing unit, and a storage device being operatively connected with said memory under control of said processing unit, whereby
   said processing unit adaptively maximizes the size of a disk scheduler buffer memory within said memory in said portable streaming device by continuously allocating available free memory in said portable streaming device, and designating and using at least a portion of said allocated free memory as the disk scheduler buffer memory.

12. The portable streaming device as claimed in claim 11, whereby said storage device is an optical disk drive.

13. The portable streaming device as claimed in claim 11, whereby said storage device is a hard-disk-based disk drive.

14. The portable streaming device as claimed in claim 11, whereby said memory comprises non-volatile solid state memory not suffering from hot spots.

15. The portable streaming device as claimed in claim 14, whereby said memory comprises magneto-resistive random access memory.

16. A computer readable medium having embodied thereon a computer program for processing by a processing unit, the computer program causing the processing unit to:
   adaptively maximizing the size of a disk scheduler buffer memory within memory of a portable streaming device by continuously allocating available free memory in said portable streaming device, and designating and using at least a portion of said allocated free memory as the disk scheduler buffer memory.

* * * * *